US012732370B2

(12) United States Patent
Kim et al.

(10) Patent No.: US 12,732,370 B2
(45) Date of Patent: Sep. 8, 2026

(54) METHOD AND SYSTEM FOR PROCESSING PERSONAL DATABASE ON BLOCK CHAIN

(71) Applicant: NAVER CORPORATION, Seongnam-si (KR)

(72) Inventors: Eun Ji Kim, Seongnam-si (KR); Yuwon Kim, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 677 days.

(21) Appl. No.: 17/136,401

(22) Filed: Dec. 29, 2020

(65) Prior Publication Data

US 2021/0119801 A1 Apr. 22, 2021

Related U.S. Application Data

(63) Continuation of application No. PCT/KR2019/004353, filed on Apr. 11, 2019.

(30) Foreign Application Priority Data

Jul. 3, 2018 (KR) ........................ 10-2018-0077340

(51) Int. Cl.

*H04L 9/32* (2006.01)
*H04L 9/00* (2022.01)
*H04L 67/306* (2022.01)
*H04L 67/50* (2022.01)

(52) U.S. Cl.

CPC .......... *H04L 9/3226* (2013.01); *H04L 9/3213* (2013.01); *H04L 67/306* (2013.01); *H04L 67/535* (2022.05); *H04L 9/50* (2022.05)

(58) Field of Classification Search

CPC ... H04L 9/3226; H04L 67/535; H04L 9/3213; H04L 67/306; H04L 9/50

USPC .............................................................. 726/5

See application file for complete search history.

(56) References Cited

U.S. PATENT DOCUMENTS 8,396,805 B2 * 3/2013 Adachi ................. H04L 9/0833 705/58
9,948,467 B2 * 4/2018 King ................... H04L 63/0853
11,032,282 B2 * 6/2021 Revanur ................. H04L 63/10
2013/0290711 A1 * 10/2013 Rajkumar ............ H04L 9/0861 713/168
2019/0147431 A1 * 5/2019 Galebach ............. H04L 9/3247 705/44

(Continued)

FOREIGN PATENT DOCUMENTS

KR 101661933000 9/2016
KR 1020170123015 11/2017

(Continued)

OTHER PUBLICATIONS

International Search Report from PCT application No. PCT/KR2019/004353, mailed on Jul. 19, 2019.

*Primary Examiner* — Moeen Khan

(74) *Attorney, Agent, or Firm* — Greer Burns & Crain Ltd.

(57) ABSTRACT

A personal data processing method includes providing personal data of a user to a blockchain network by means of a personal identification key in the blockchain network that is registered for the user in different services that identify the same user with different identifiers. The personal data of the user in the different services can be tracked and utilized with the personal identification key.

17 Claims, 9 Drawing Sheets

(56) References Cited

U.S. PATENT DOCUMENTS

2019/0166101 A1* 5/2019 Ramos .................. H04L 9/3239
2019/0312863 A1* 10/2019 Chow ................... H04L 9/0643
2019/0333142 A1* 10/2019 Thomas .................. G06F 16/27
2019/0361917 A1* 11/2019 Tran .................... H04W 12/108
2020/0167870 A1* 5/2020 Isaacson .............. G06Q 50/265
2020/0193432 A1* 6/2020 Millar ................ G06Q 30/0283

FOREIGN PATENT DOCUMENTS

KR 101816650000 1/2018
KR 101841657000 3/2018
KR 101848896000 4/2018

* cited by examiner

FIG. 9

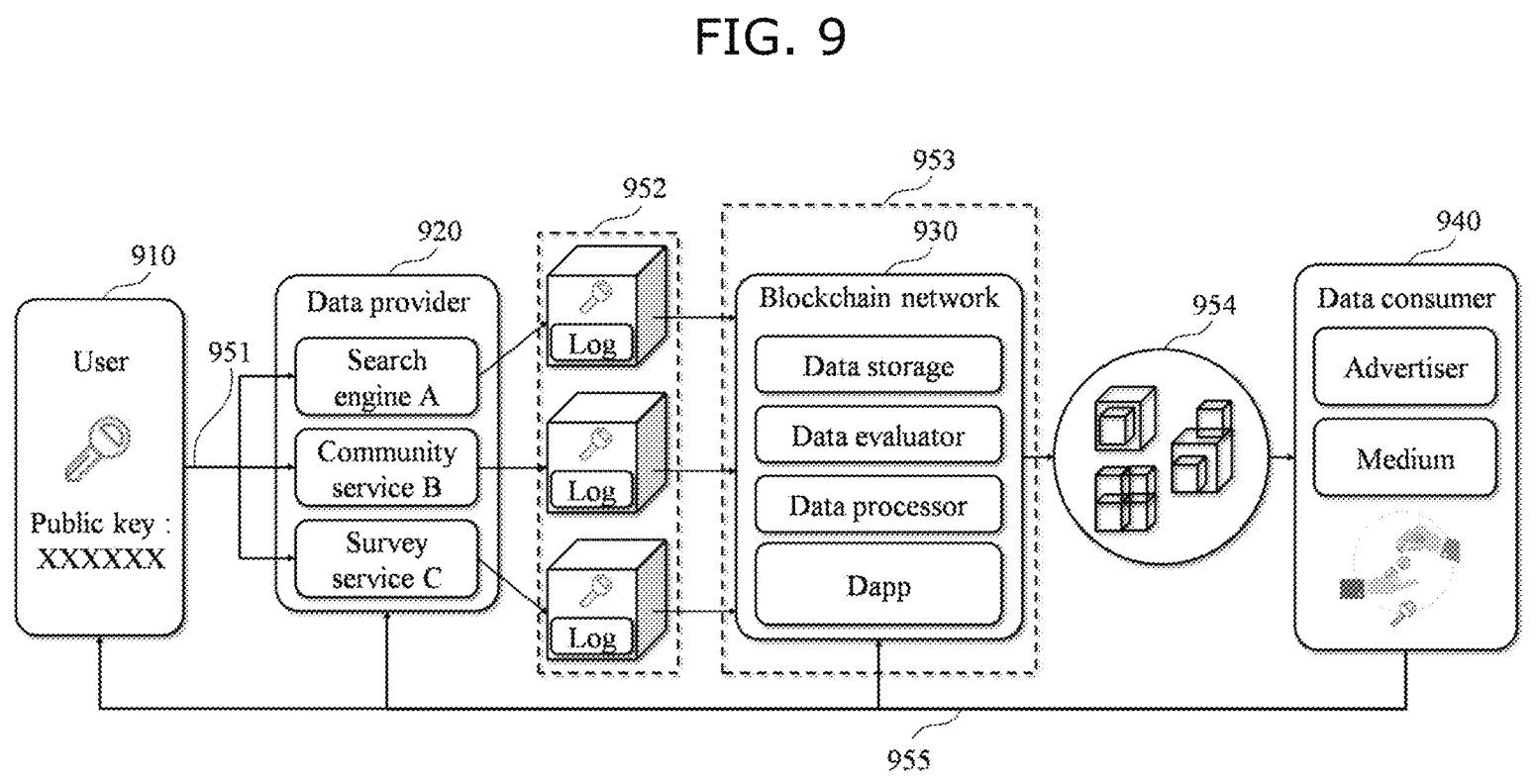

910
User
Public key : XXXXXX
951
920
Data provider
Search engine A
Community service B
Survey service C
952
Log
Log
Log
953
930
Blockchain network
Data storage
Data evaluator
Data processor
Dapp
954
940
Data consumer
Advertiser
Medium
955

METHOD AND SYSTEM FOR PROCESSING PERSONAL DATABASE ON BLOCK CHAIN

CROSS-REFERENCE TO RELATED APPLICATIONS

This is a continuation application of International Application No. PCT/KR2019/004353 filed Apr. 11, 2019, which claims the benefit of Korean Patent Application No. 10-2018-0077340 filed Jul. 3, 2018.

BACKGROUND OF THE INVENTION

Field of Invention

The following description relates to a method and a system for processing personal data based on a blockchain and, more particularly, to a personal data processing method capable of tracking and utilizing personal data of the same user based on a personal identification key in different services in which the corresponding user is identified by different IDs, by providing a blockchain network with the personal data of the corresponding user using the personal identification key in the blockchain network registered with respect to the corresponding user in the different services. The present invention also relates to a personal data processing system performing the personal data processing method, a computer device for implementing the personal data processing system, and a computer program stored in a computer-readable recording medium for executing the personal data processing method in a computer.

Description of Related Art

There are many data traces left as individual users conduct activities on the Internet, but there is no absolute ID which can bind such data traces as a continuous behavior of one individual. There are only IDs (e.g., resident registration numbers or IDs for a variety of types of services) partially traded by a centralized platform, such as a government or a private company. Accordingly, a plurality of different services identifies the same one user based on a plurality of different IDs, and thus the same one user is recognized as if he or she is a plurality of different users in the different services. For example, a situation in which the same one user is identified by a first ID in a first service and identified by a second ID in a second service may be considered. When content "a" of content provider A is exposed to the user having the first ID in the first service and exposed to the user having the second ID in the second service, content "a" is substantially exposed to the same one user, but there is a problem in that from a viewpoint of content provider A, content "a" has a history in which the content is exposed to the two users, including the user having the first ID in the first service and the user having the second ID in the second service. As described above, today, the identification system of services for individual users on the Internet does not identify one individual as the same one individual, and the same one individual is recognized as a plurality of different users depending on the identification system in multiple services.

BRIEF SUMMARY OF THE INVENTION

Provided is a personal data processing method capable of tracking and utilizing personal data of the same user through a personal identification key in different services in which the corresponding user is identified by different IDs, by providing a blockchain network with the personal data of the corresponding user using the personal identification key in the blockchain network registered with respect to the corresponding user in the different services. Also provided is a personal data processing system performing the personal data processing method, a computer device for implementing the personal data processing system, and a computer program stored in a computer-readable recording medium for executing the personal data processing method in a computer.

There is provided a method of providing, by a payment platform, an integrated financial service, including the steps of managing transaction history information of users registered with the payment platform; receiving financial information, corresponding to each of the registered users, from a plurality of financial platforms providing a plurality of individual financial services; generating integrated financial information for each of the registered users by storing the financial information in a database in association with the registered users; and generating credit-rating information for each of the registered users using the integrated financial information and the transaction history information stored in the database.

There is provided a computer program stored in a computer-readable recording medium for executing the method of providing an integrated financial service in a computer.

There is provided a non-transitory computer-readable recording medium for storing a program for executing the method of providing an integrated financial service in a computer.

There is provided a computer device comprising at least one processor implemented to execute a computer-readable recording instruction, wherein the at least one processor manages transaction history information of users registered with the payment platform, receives financial information, corresponding to each of the registered users, from a plurality of financial platforms providing a plurality of individual financial services, generates integrated financial information for each of the registered users by storing the financial information in a database in association with the registered users, and generates credit-rating information for each of the registered users using the integrated financial information and the transaction history information stored in the database.

Personal data of the same user in different services in which the corresponding user is identified by different IDs can be tracked and used based on a personal identification key by providing a blockchain network with the personal data of the corresponding user using the personal identification key in the blockchain network registered with respect to the corresponding user in the different services.

BRIEF DESCRIPTION OF THE DRAWINGS

FIG. 9 is a diagram illustrating an example of a process in which the data of an individual user is traded to data consumers and a value is circulated in a blockchain network in an embodiment of the present invention.

DETAILED DESCRIPTION OF THE INVENTION

Hereinafter, embodiments are described in detail with reference to the accompanying drawings.

A personal data processing method according to embodiments of the present invention may be implemented through at least one computer device such as an electronic device or a server to be described later. In this case, a computer program according to an embodiment of the present invention may be installed and driven in the computer device. The computer device may perform the personal data processing method according to embodiments of the present invention under the control of the driven computer program. The computer program may be stored in a computer-readable recording medium in order to execute the personal data processing method in the computer device in association with the computer device.

Figure 1:
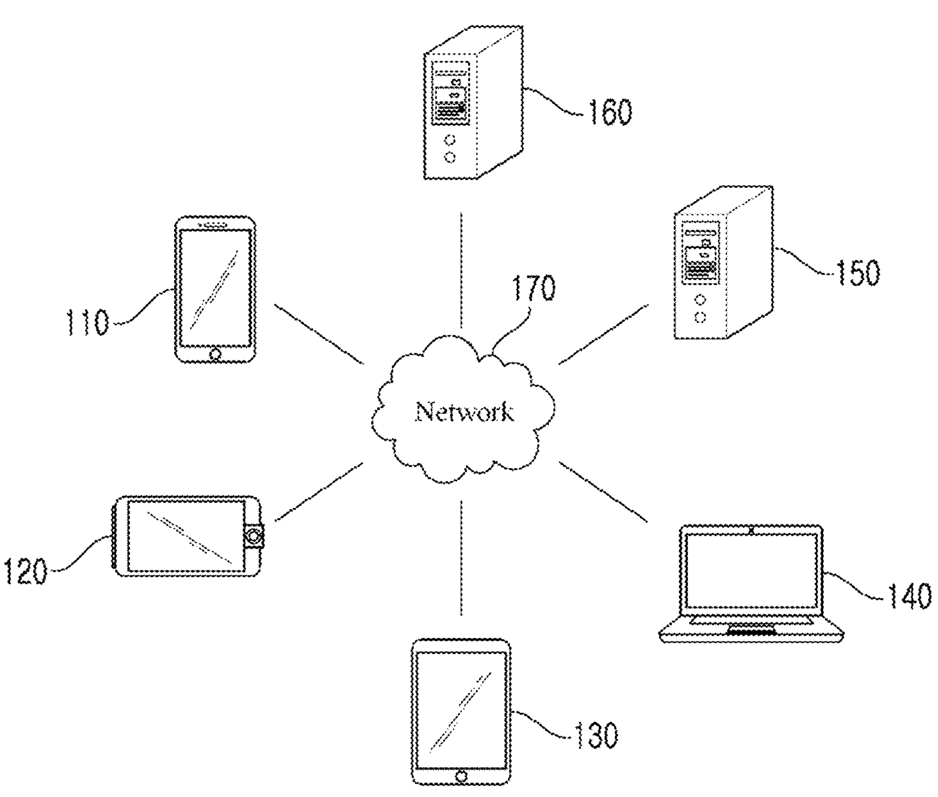
FIG. 1 is a diagram illustrating an example of a network environment according to an embodiment of the present invention.

FIG. 1 is a diagram illustrating an example of a network environment according to an embodiment of the present invention. The network environment of FIG. 1 illustrates an example including a plurality of electronic devices 110, 120, 130, and 140, a plurality of servers 150 and 160, and a network 170. The number of electronic devices or the number of servers is not limited to that of FIG. 1. Furthermore, the network environment of FIG. 1 merely describes an example of environments applicable to the present embodiments, and an environment applicable to the present embodiments is not limited to the network environment of FIG. 1.

Each of the plurality of electronic devices 110, 120, 130 and 140 may be a stationary terminal or a mobile terminal implemented as a computer device. For example, the plurality of electronic devices 110, 120, 130 and 140 may include a smartphone, a mobile phone, a navigation device, a computer, a laptop computer, a device for digital broadcasting, personal digital assistants (PDA), a portable multimedia player (PMP), a tablet PC, etc. For example, in FIG. 1, a shape of a smartphone is illustrated as being an example of the electronic device 110. However, in embodiments of the present disclosure, the electronic device 110 may mean one of various physical computer devices capable of communicating with other electronic devices 120, 130 and 140 and/or the servers 150 and 160 over the network 170 substantially using a wireless or wired communication method.

The communication method is not limited, and may include short-distance wireless communication between devices in addition to communication methods using communication networks (e.g., a mobile communication network, wired Internet, wireless Internet, and a broadcasting network) which may be included in the network 170. For example, the network 170 may include one or more given networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but is not limited thereto.

Each of the servers 150 and 160 may be implemented as a computer device or a plurality of computer devices, which provides an instruction, a code, a file, content, or a service through communication with the plurality of electronic devices 110, 120, 130 and 140 over the network 170. For example, the server 150 may be a system that provides a service (e.g., a financial service, a payment service, social networking service, a messaging service, a search service, a mail service, or a content providing service) to the plurality of electronic devices 110, 120, 130, and 140 connected thereto over the network 170.

Figure 2:
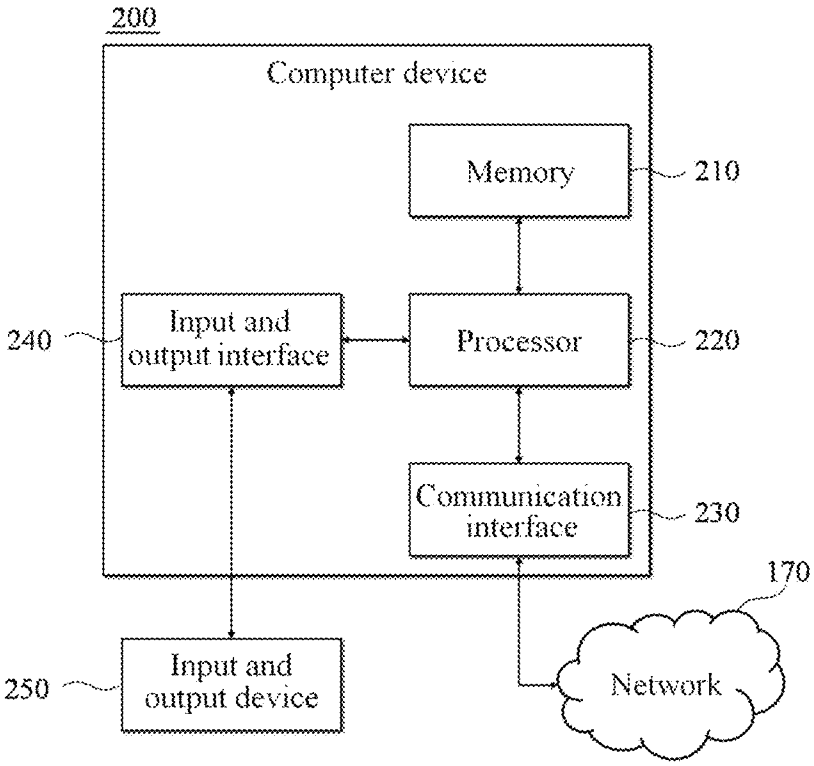
FIG. 2 is a block diagram illustrating an example of a computer device according to an embodiment of the present invention.

FIG. 2 is a block diagram illustrating an example of a computer device according to an embodiment of the present invention. Each of the plurality of electronic devices 110, 120, 130, and 140 or each of the servers 150 and 160 may be implemented by a computer device 200 illustrated in FIG. 2. A personal data processing method according to an embodiment may be performed by a personal data processing system implemented by the computer device 200.

As illustrated in FIG. 2, the computer device 200 may include a memory 210, a processor 220, a communication interface 230, and an input and output interface 240. The memory 210 is a computer-readable recording medium, and may include permanent mass storage devices, such as a random access memory (RAM), a read only memory (ROM) and a disk drive. Permanent mass storage devices, such as a ROM and a disk drive, may also be included in the computer device 200 separated from the memory 210. Furthermore, an operating system and at least one program code may be stored in the memory 210. Such software elements may be loaded from a computer-readable recording medium, separated from the memory 210, to the memory 210. Such a separate computer-readable recording medium may include computer-readable recording media, such as a floppy drive, a disk, a tape, a DVD/CD-ROM drive, and a memory card. In another embodiment, software elements may be loaded onto the memory 210 through the communication interface 230, and not from a computer-readable recording medium. For example, the software elements may be loaded onto the memory 210 of the computer device 200 based on a computer program installed by files received over the network 170.

The processor 220 may be configured to process an instruction of a computer program by performing basic arithmetic, logic and input and output operations. The instructions may be provided to the processor 220 by the memory 210 or the communication interface 230. For example, the processor 220 may be configured to execute received instructions based on a program code stored in a recording device, such as the memory 210.

The communication interface 230 may provide a function for enabling the computer device 200 to communicate with other devices (e.g., the aforementioned storage devices) over the network 170. For example, a request, an instruction, data or a file generated by the processor 220 of the computer device 200 based on a program code stored in a recording device, such as the memory 210, may be provided to other devices over the network 170 under the control of the communication interface 230. Inversely, a signal, an instruction, data or a file from another device may be received by the computer device 200 through the communication interface 230 of the computer device 200 over the network 170. The signal, instruction or data received through the communication interface 230 may be transmitted to the processor 220 or the memory 210. The file received through the communication interface 230 may be stored in a storage device (i.e., the aforementioned permanent storage device) which may be further included in the computer device 200.

The input and output interface 240 may be means for interfacing with an input and output device 250. For example, the input device of the input and output device 250 may include, for example, a microphone, a keyboard, or a mouse. The output device of the input and output device 250 may include, for example, a display or a speaker. As another example, the input and output interface 240 may be means for interfacing with a device in which functions for input and output have been integrated into one, such as a touch screen. The input and output device 250, together with the computer device 200, may be configured as a single device.

The computer device 200 may include greater or smaller number of elements than the those shown FIG. 2. For example, the computer device 200 may be implemented to include a portion of the input and output devices 250 or may further include other elements, such as a transceiver and a database.

Figure 3:
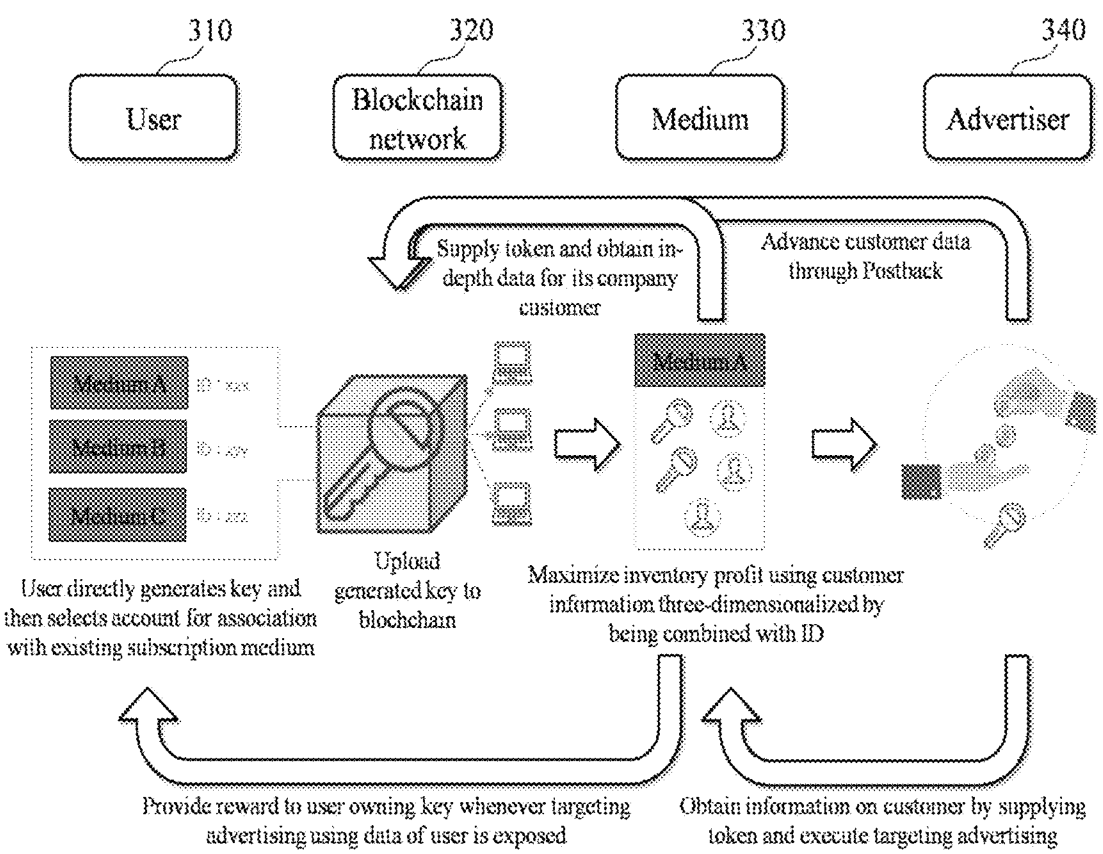
FIG. 3 is a diagram illustrating an example of a process of processing personal data in association with a blockchain in an embodiment of the present invention.

FIG. 3 is a diagram illustrating an example of a process of processing personal data in association with a blockchain in an embodiment of the present invention. FIG. 3 illustrates a user 310, a blockchain network 320, a medium 330 and an advertiser 340.

The user 310 may mean a given user of individual users on the Internet, and may be a subject who uses an online service or an app and may be a data owner who has user control over data generated due to the use and individual identity.

An interaction between the user 310 and the blockchain network 320 and an interaction between the user 310 and the medium 330 may be performed through an electronic device which may be implemented as a computer, such as the terminal of the user 310. For example, the electronic device may correspond to any one of the plurality of electronic devices 110, 120, 130, and 140 described with reference to FIG. 1.

In this case, the user 310 may have a personal identification key directly issued thereto as an ID capable of uniquely identifying the user using the electronic device. For example, upon first association, the electronic device of the user 310 may receive a public key from the blockchain network 320 in response to a request from the user 310 and under the control of a computer program, and may transmit, to the medium 330, a blockchain wallet address corresponding to the received public key as the personal identification key, so that the personal identification key and the account of the user 310 registered with the medium 330 may operate in conjunction with each other. For example, the personal identification key may be generated by applying a hash algorithm to the public key. For another example, the public key itself may become a personal identification key, as a divider capable of identifying an individual user and a blockchain wallet address at which a token is kept in the blockchain network 320. Hereinafter, embodiments in which the public key issued through the blockchain network 320 corresponds to a personal identification key are described, but various modifications of the public key may be used as a personal identification key like the application of the hash algorithm. In this case, a token may be means that is used as transaction means by participants of the blockchain network 320, and may be defined according to a blockchain protocol applied to the blockchain network 320. The nodes of the blockchain network 320 may act as a data storage and an evaluator, may perform a task based on proof of believability (PoB), that is, a reliability-based agreement protocol, and may function to defend the blockchain network 320 against a variety of types of abuses and attacks.

In other words, the electronic device of the user 310 may access the medium 330 selected by the user 310, and may associate the personal identification key with the account of the user 310 (the ID of the user 310) registered with the medium 330 through a function provided by the medium 330. For example, the electronic device may sequentially access medium A, medium B, and medium C sequentially selected by the user 310, and may sequentially associate the personal identification key of the user 310 with the accounts of the media.

A subject who is best aware of data left on the Internet and who is a user is an "individual", that is, the person directly involved in generating the data. If an individual can directly connect online activity information to the medium 330 or the advertiser 340 as the owner of data, it may be effective compared to an attempt to connect individual services for specifying an individual. For example, from the point of view of advertisement targeting, when an individual directly connects online activity information to the medium 330 or advertiser 340 as the owner of the data, the individual's interest is reflected as it is. Accordingly, targeting accuracy may be improved than that of individual services estimating personal interests and connecting the online activity information of the estimated personal to the media 330 or the advertiser 340. Furthermore, conventionally, it is impossible for an individual to track how his or her data is collected and used because there is no unique key capable of identifying the individual online. However, according to an embodiment of the present invention, if the data of an individual can be collected on the blockchain network 320 using the personal identification key, the data can be tracked or the individual can have a reward for the provision of the data as a data owner.

The medium 330 may be a data provider and a data consumer. For example, a data provider may be a subject that provides the user with services in a form such as an online site, a computer program and/or an app, and that collects data through such a process. The data collected by the data provider may be transmitted to the blockchain network 320 in lieu of being transmitted by the individual user. Furthermore, a data consumer is a subject that creates value using personal data, and may create a profit using the data of an individual user obtained from the blockchain network 320 after paying (or agreeing to pay) for the token of the blockchain network 320. In addition to the medium 330, the advertiser 340 may generate a profit using the data of an individual user obtained from the blockchain network 320, for example, in the execution of target advertising and customer analysis as such a data consumer.

The medium 330 as a data provider may generate a transaction block including information on an activity of the user 310 using the personal identification key of the user 310, and may upload the transaction block to the blockchain network 320. If all of medium A, medium B, and medium C generate transaction blocks including information on the activity of the user 310 and generate the transaction blocks to the blockchain network 320 and such transaction blocks are combined with a blockchain, continuous activities and/or data in each of medium A, medium B, and medium C of the user 310 may be combined through a personal identification key, that is, a unique ID of the user 310.

In this case, the medium 330 can obtain information on the activities and/or data of the user 310 based on the personal identification key in the blockchain network 320 as a data consumer in a plurality of different services in which the user 310 is conventionally identified by different IDs. For example, medium A may obtain even information on the activity of the user 310 in medium B and medium C, in addition to information on the activity of the user 310 in medium A conventionally.

The existing media (e.g., web sites and/or applications) that provide services to users online are limited in that it is difficult to know who customers/visitors are based on only data owned by each of the media. Conventionally, there is a problem in that it is difficult for the media themselves to analyze a customer by requesting analysis through data trading companies, such as a data management platform (DMP), or collect customer information without infringing customers' privacy. Furthermore, even when an attempt is made to make a profit by posting advertising on an inventory owned by the existing media, it is difficult to generate a detailed customer profile based on only customer data of the media. Accordingly, there are problems in that subdivided audience targeting was difficult and it was difficult to obtain effective Cost Per Mille (eCPM), which result in a low profit of the media.

However, according to an embodiment of the present invention, if the activities and/or data of users in multiple media are uploaded to the blockchain network 320 through the personal identification key of each of the users, each of the media may generate a stereoscopic customer profile by binding the activities and/or data of users operating in conjunction with other media as one personal identification key, so that a path through which individual media may analyze customers in more depth is generated. Accordingly, the profitability of inventories owned by the media can be improved because each of the media can provide advertisers with subdivided data related to customers who use a corresponding medium.

Furthermore, as already described above, the advertiser 340 can also obtain more advanced information on the user 310 over the blockchain network 320 or through the medium 330 that obtains information (the activities and/or data of the user 310 on the Internet) over the blockchain network 320 as a data consumer. For example, if advertising "a" of the advertiser 340 is exposed to the user 310 through medium A and medium B, the advertiser 340 can be aware that the advertising "a" has been twice exposed to one user 310 not two different users based on information obtained in accordance with a personal identification key in the blockchain network 320.

Existing advertisers cannot help but one-sidedly trusting numerical values provided by an intermediate trader (advertising platform or DMP) with respect to performance, such as whether corresponding advertising will reach actual users while exposing the advertising online, and to whom the advertising is exposed and how many clicks on the advertising are made. Furthermore, although the provided numerical values are accurate, the existing advertisers cannot be liberated from the issue of whether the advertising is actually exposed, i.e., posted, and whether users who click on exposed or posted advertising are truly intrinsic users or are bots. Accordingly, existing advertisers cannot help but worry about the possibility of data forgery because there is no method of verifying whether users are actually target audiences desired by the advertisers or whether the users are redundant users. However, according to an embodiment of the present invention, advertisers can directly identify target audiences for which advertising is to be executed and accurately expose their advertising to corresponding target audiences for each medium because users are distinguished based on personal identification keys, that is, unique IDs, and a medium operating in conjunction with each user can be confirmed. Furthermore, even after advertising is exposed, a click for the exposed advertising and a conversion for the clicked advertising can be identified in a personal identification key unit, that is, a unique ID. Meanwhile, a user "a" introduced from medium A can be easily identified as a member "b" of medium B based on the personal identification key. Accordingly, precise change data can be obtained based on an individual customer, and a value per precise change can be measured because a data mapping issue can also be reduced upon change measurement. Furthermore, embodiments of the present invention can contribute to a customer profile becoming more three-dimensional through a postbag. In this case, the postbag is to transmit, to an advertising network, a specific action of a customer introduced from the advertising network again, and may mean a function used for retargeting/remarketing.

As described above, the medium 330 can obtain in-depth data of a customer belonging to the medium by supplying a token to the blockchain network 320 as a data consumer, and can maximize an inventory profit using the obtained in-depth data. The advertiser 340 can also obtain information on a customer by supplying a token to the blockchain network 320, can execute target advertising through the medium 330 based on the obtained information, and can advance customer data through the postbag as described above. Since such data of an individual user is used, a data consumer, such as the medium 330 and/or the advertiser 340, can provide a reward to the user 310 who owns a personal identification key because the data of the user 310 is used, such as a case where target advertising is exposed to the user 310 identified based on the corresponding personal identification key using the data of the user 310.

Figure 4:
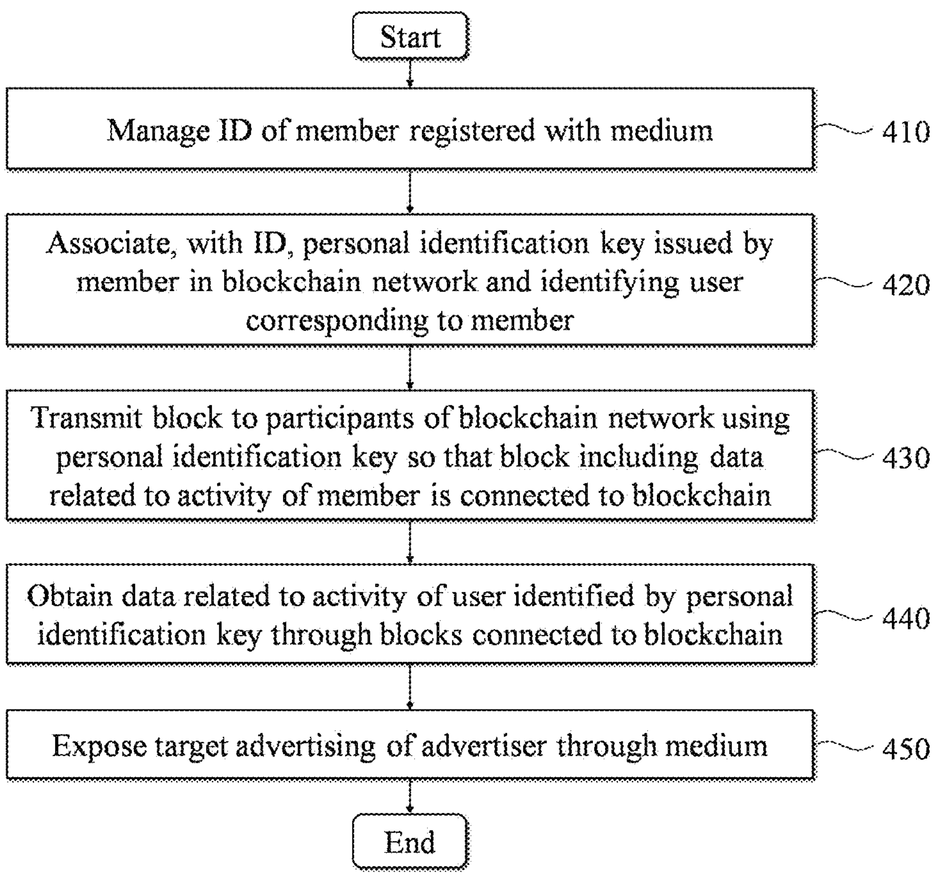
FIG. 4 is a flowchart illustrating an example of a personal data processing method from a viewpoint of a medium in an embodiment of the present invention.

FIG. 4 is a flowchart illustrating an example of a personal data processing method from a viewpoint of the medium 330 in an embodiment of the present invention. The personal data processing method according to the present embodiment may be performed by the computer device 200 that implements the medium 330, for example. For example, the processor 220 of the computer device 200 may be implemented to execute a control instruction according to a code of an operating system or a code of at least one program included in the memory 210. In this case, the processor 220 may control the computer device 200 to perform steps 410 to 460 included in the method of FIG. 4 according to control instructions provided by the code stored in the computer device 200.

At step 410, the computer device 200 may manage the ID of a member registered with the medium 330. The ID of the member may mean an ID (e.g., login ID or a telephone number) that is registered, stored, and managed for each member in order for the medium to identify the member, for example. As described above, since each medium 330 has a different user identification system, the ID of a member registered with the medium 330 can identify the member in services of that same medium, but does not identify a member of another medium.

At step 420, the computer device 200 may associate, with the ID, a personal identification key that is issued by the member in the blockchain network and that identifies a user corresponding to the member. As described above, the user may have the personal identification key issued from the blockchain network, and may associate the issued personal identification key with the accounts of each medium 330 desired by the user. For example, the user may access the system of the medium 330 using its own computer terminal, and may request association between the account of the user, registered with the medium 330, and the personal identification key issued to the user in a form in which the personal identification key is input using a function provided by the medium. In this case, the computer device 200 that implements the medium 330 may associate the ID, registered with the medium 330, and the personal identification key transmitted through the terminal of the user, with respect to the user, in response to a request from the user. For example, the computer device 200 may associate and store the transmitted personal identification key and the registered ID of the user. The ID for identifying the user in the medium 330 may include the ID of the user already registered with the medium and/or a cookie value already issued to the user. For example, with respect to a login user who uses a service of the medium 330 in a login state, the computer device 200 may associate the personal identification key of the login user and the ID of the login user registered with the medium 330. In contrast, with respect to a non-login user who uses a service without logging in, the computer device 200 may associate a cookie value of a browser cookie, previously issued to the corresponding non-login user, with a personal identification key, so that an actual user can be identified based on the personal identification key with respect to a non-login user (including a case where the non-login user is a non-member of the service).

At step 430, the computer device 200 may transmit a block, including data related to an activity of the member, to participants of the blockchain network using the personal identification key so that the block is connected to a blockchain. If mutual information verification is completed by the participants, the corresponding block may be combined with the blockchain, and data related to activities in the medium 330 of a user identified by the personal identification key may be written in the blockchain. In other words, the medium 330 may provide the blockchain network with the data related to the activity of the user in the medium 330 as a data provider.

Furthermore, the user may associate the personal identification key with the accounts of each of multiple media 330. In this case, since the personal identification key is associated with each of the IDs of different media 330 having different identification systems for the user, blocks including data related to the activity of the user in the different media 330 may be transmitted to participants of the blockchain network using the personal identification key so that the blocks are connected to the blockchain. In this case, if mutual information verification is completed by the participants, the blocks transmitted to the participants may be combined with the blockchain, and data related to the activities in different media of the user identified by the personal identification key may be written in the blockchain. Accordingly, a specific medium or a specific advertiser can obtain comprehensive information on activities in multiple media 330 of a user identified by a personal identification key with respect to a blockchain.

At step 440, the computer device 200 may obtain data related to an activity of the user identified by the personal identification key through the blocks connected to the blockchain. In this case, the data related to the activity of the user obtained through the blocks connected to the blockchain may include data included in blocks actually connected to the blockchain, among the blocks transmitted to the participants of the blockchain network so that each of the different media is connected to the blockchain. In other words, all of the blocks transmitted to be connected to be the blockchain are not connected to the blockchain, but only blocks on which mutual information verification is completed by the participants may be connected to the blockchain. Data included in the blocks connected to the blockchain may integrate and provide information on an online activity of the user identified by the personal identification key. For example, the computer device 200 may obtain data related to an activity of a user in each of multiple media 330 with which a personal identification key is associated by the user, not the data related to the activity of the user in individual a corresponding medium. As described above, the medium 330 implemented by the computer device 200 according to the present embodiment can obtain and use three-dimensional customer information combined with a personal identification key, so that an inventory profit can be maximized. Step 440 illustrates that a medium 330 functions to provide the blockchain network with data related to an activity of a user in the medium as a data provider and also functions to obtain and consume data related to the activity of the user integrated with the blockchain network as a data consumer.

Furthermore, at step 440, the computer device 200 may purchase data related to an activity of a user, identified by the personal identification key, using a token used as transaction means by the participants in the blockchain network. In other words, the media 330 may obtain the data related to the activity of the user by purchasing the data using the token. In this case, a reward according to the purchase of the data may be provided to at least one of the user identified by the personal identification key and the media that has provided the blockchain network with the data related to the activity of the user. The reward provided to the user may be a reward provided as the user makes his or her own data public to media and/or advertisers through the personal identification key as the owner of the data, and may be formed in various forms, such as spot commodities, cash, or cyber digital money.

At step 450, the computer device 200 may expose target advertising of an advertiser through the medium 330. The advertiser may also obtain integrated data related to an online activity of the user, identified by the personal identification key, over the blockchain network, may obtain information on the user through the corresponding data, and may execute the target advertising in the medium 330. In this case, the medium 330 may expose, to the user, the target advertising requested by the advertiser. Data related to an activity of each of users may form a blockchain in the blockchain network with respect to a personal identification key generated for each of individual users online. The medium 330 and the advertiser may obtain integrated data related to the activity of each of the users online. The advertiser may directly identify target audiences through such integrated data, and may expose the advertising to the target audiences for each medium.

Meanwhile, an embodiment in which if target advertising is exposed to a user identified by a personal identification key and an activity intended by an advertiser occurs, a reward may be provided to the user identified by the personal identification key may also be considered. In this case, the activity intended by the advertiser may include at least one of various activities, such as the exposure of the target advertising, the selection of the exposed target advertising (e.g., the user clicks on the exposed target advertising or touches an area where the target advertising is exposed area in a touch screen environment), the subscription of a member to an advertiser service through the target advertising, and a change according to the purchase of goods or a service through the target advertising. For example, data consumers, such as media or advertisers, may purchase data related to an activity of a user from a blockchain network using a token. A reward according to such purchase may be provided to media that have provided the blockchain network with the data related to the activity of the user. In this case, the medium provided with the reward may provide the reward to users who are exposed to target advertising through the target advertising through their own media and do an activity intended by an advertiser.

Figure 5:
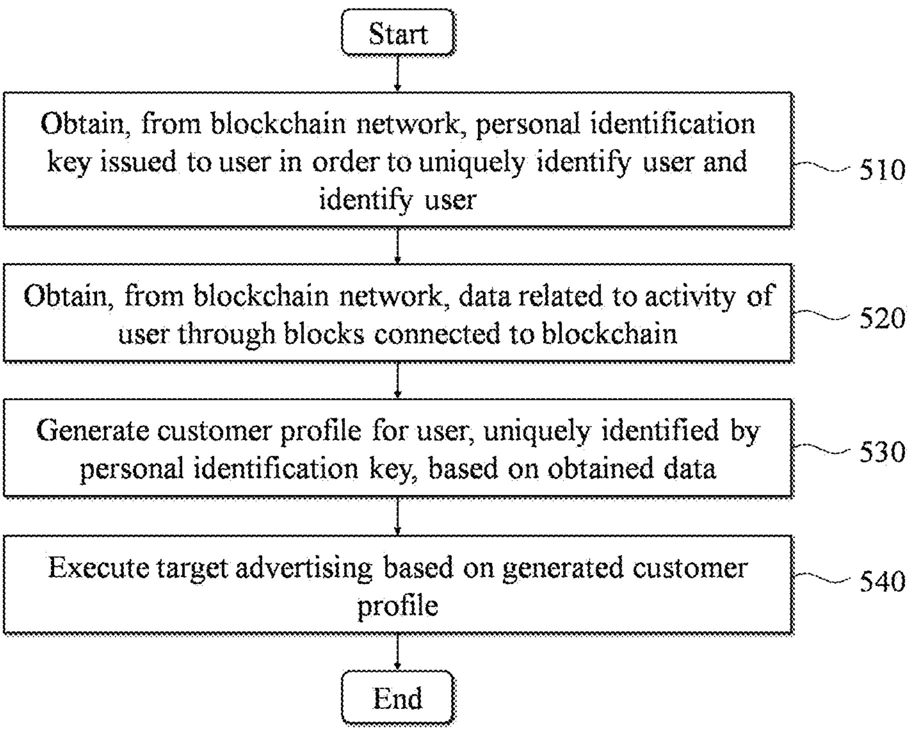
FIG. 5 is a flowchart illustrating an example of a personal data processing method from a viewpoint of an advertiser in an embodiment of the present invention.

FIG. 5 is a flowchart illustrating an example of a personal data processing method from a viewpoint of the advertiser 340 in an embodiment of the present invention. The personal data processing method according to the present embodiment may be performed by the computer device 200 that implements the aforementioned system (advertiser system) of the advertiser 340, for example. For example, the processor 220 of the computer device 200 may be implemented to execute a control instruction according to a code of an operating system or a code of at least one program included in the memory 210. In this case, the processor 220 may control the computer device 200 to perform steps 510 to 540 included in the method of FIG. 5 according to a control instruction provided by the code stored in the computer device 200.

At step 510, the computer device 200 of the advertiser 340 may obtain, from a blockchain network, a personal identification key issued to a user in order to uniquely identify the user. Individual users online or on the Internet may directly select whether to provide data related to activities in the medium 330 in which the user do activities as the owner of the data. For example, the user 310 may have a personal identification key issued through the blockchain network 320, and may select a medium 330 through a process of connecting to the account of the medium 330 to which data will be provided. Upon association between the personal identification key and the account of the medium 330 (the ID of the user in the medium), the corresponding medium 330 may attempt to connect, to a blockchain, a block generated by combining data related to the activity of the user with the personal identification key. The data connected to the blockchain may be provided to data consumers, such as media 330 and/or advertisers 340. In this case, the data consumers may also be participants of the corresponding blockchain network, and may purchase the data included in the blockchain of the user 310, identified by the personal identification key, using a token provided by the blockchain network. An advertiser system implemented by the computer device 200 may also identify an individual user 310 based on a personal identification key, and may purchase the data of the user 310 identified by the corresponding personal identification key through the blockchain network 320. In this case, a reward according to the purchase of the data may be provided to at least one of the user identified by the personal identification key and media 330 that have provided, to the blockchain network 320, data related to the activity of the user 310.

At step 520, the computer device 200 may obtain, from the blockchain network 320, data related to the activity of the 310 user through blocks connected to a blockchain. As described above, since the personal identification key operates in conjunction with the IDs of different media 330 having different identification systems for the user 310, the blocks including data related to activities of the user in the different media 330 may be transmitted to participants of the blockchain network 320 using the personal identification key so that the blocks are connected to the blockchain. Blocks on which mutual information verification has been completed by the participants, among the blocks transmitted to the participants, may be connected to the blockchain. In this case, an advertiser system implemented by the computer device 200 may obtain, from the blocks connected to the blockchain, the data related to the activity of the user 310.

At step 530, the computer device 200 may generate a customer profile for the user 310, uniquely identified by the personal identification key, based on the obtained data. As already described above, the obtained data may be data related to the activity of the user in a plurality of different media 330 having different identification systems, not simply the activity of the user in one medium 330. Accordingly, an advertiser system may generate the customer profile in unit of an actual individual that does activities online, not in unit of members identified for each medium.

At step 540, the computer device 200 may execute target advertising based on the generated customer profile. In this case, more precise targeting for advertising may be made possible based on the customer profile generated in unit of individual users 310 identified by the personal identification key. In addition, even after the target advertising is exposed, a click on or a change in the exposed target advertising can be precisely checked in unit of the personal identification key through the blockchain, and a value per change can be measured by obtaining precise change data for individual users. Furthermore, the customer profile may become more three-dimensional through a postbag.

Figure 6:
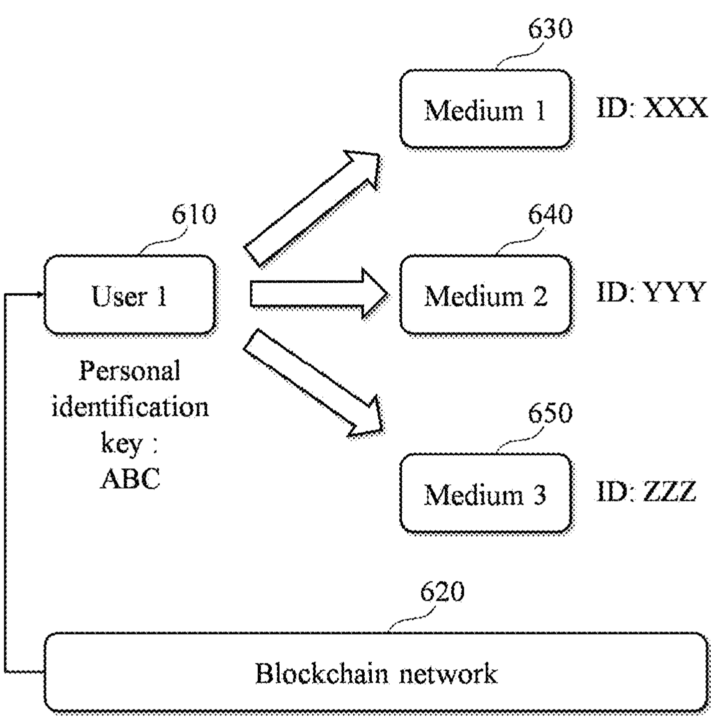
FIGS. 6 and 7 are diagrams illustrating examples of a process of associating a personal identification key and the ID of a medium in an embodiment of the present invention.
Figure 7:
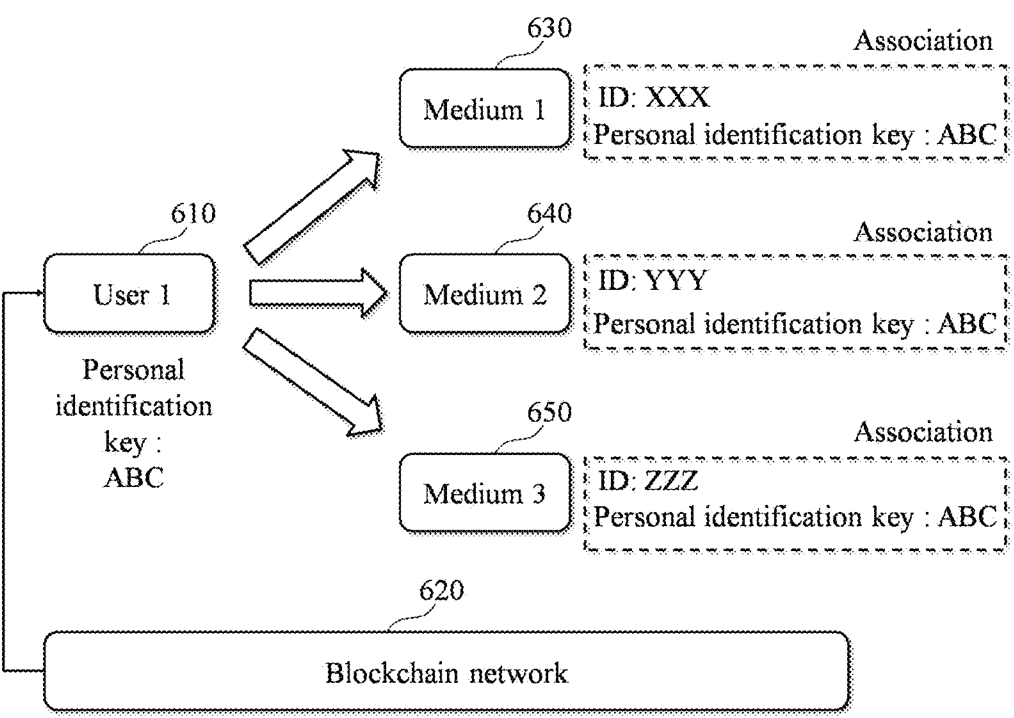

FIGS. 6 and 7 are diagrams illustrating examples of a process of associating a personal identification key and the ID of a medium 330 in an embodiment of the present invention.

FIG. 6 illustrates user 1 610, a blockchain network 620, medium 1 630, medium 2 640, and medium 3 650. Furthermore, FIG. 6 illustrates an example in which user 1 610 has a personal identification key ABC issued through the blockchain network 620 and requests the association of the personal identification key from each of medium 1 630 that identifies user 1 610 as ID "XXX", medium 2 640 that identifies user 1 610 as ID "YYY", and medium 3 650 that identifies user 1 610 as ID "ZZZ."

FIG. 7 illustrates an example in which each of the media (medium 1 630, medium 2 640, and medium 3 650) has associated the personal identification key with the IDs in response to the request from user 1 610. For example, medium 1 630 may associate the personal identification key "ABC" and the ID "XXX" of user 1 610 in a form in which the ID and the personal identification key are associated and stored. For multiple users, each of the media (medium 1 630, medium 2 640, and medium 3 650) may associate and store IDs for identifying the corresponding users and personal identification keys issued from the blockchain network 620 and transmitted by the corresponding users, respectively.

Figure 8:
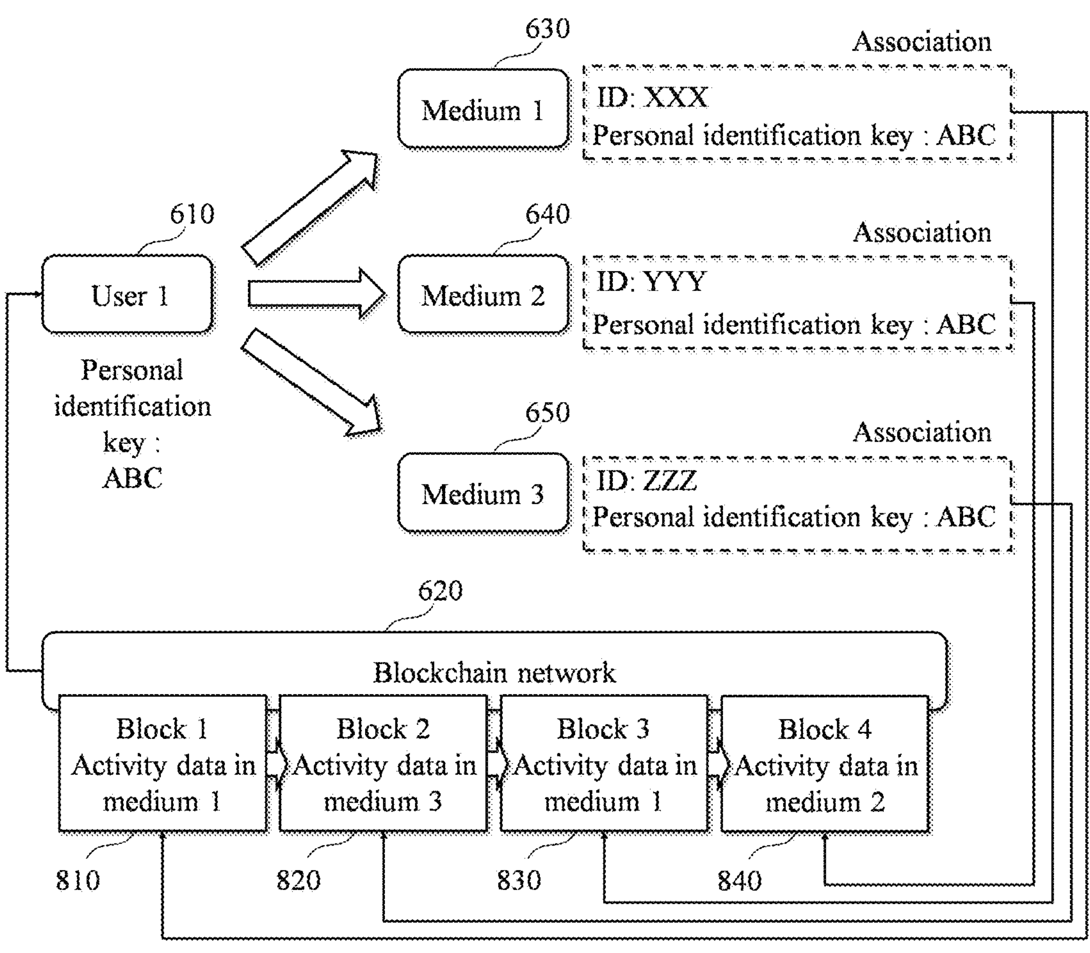
FIG. 8 is a diagram illustrating an example of a process of connecting blocks, including data related to an activity of a user, to a blockchain based on a personal identification key in an embodiment of the present invention.

FIG. 8 is a diagram illustrating an example of a process of connecting blocks, including data related to an activity of a user, to a blockchain based on a personal identification key in an embodiment of the present invention. FIG. 8 illustrates examples in which each of the media (medium 1 630, medium 2 640, and medium 3 650) has associated, with a blockchain for user 1 610, data related to activities (hereinafter "activity data") of user 1 610 by adding the data to a block. In this case, it is assumed that activity 1 in medium 1 630, activity 2 in medium 3 650, activity 3 in medium 1 630, and activity 4 in medium 2 640 were sequentially performed by user 1 610. In this case, medium 1 630 may generate block 1 810 by combining, with the personal identification key "ABC" associated with ID "XXX", activity 1 data for activity 1 of user 1 610, that is, a member identified as ID "XXX" in medium 1 630, and may transmit generated block 1 810 to participants of the blockchain network 620. Likewise, medium 3 650 may generate block 2 820 by combining, with personal identification key "ABC" associated with ID "ZZZ", activity 2 data for activity 2 of user 1 610, that is, a member identified as ID "ZZZ" in medium 3 650, and may transmit generated block 2 820 to the participants of the blockchain network 620. Furthermore, medium 1 630 may generate block 3 830 by combining, with personal identification key "ABC" associated with ID "XXX", activity 3 data for activity 3 of user 1 610, that is, a member identified as ID "XXX" in medium 1 630, and may transmit generated block 3 830 to the participants of the blockchain network 620. Finally, medium 2 640 may generate block 4 840 by combining, with the personal identification key "ABC" associated with ID "YYY", activity 4 data for activity 4 of user 1 610, that is a member identified as ID "YYY" in medium 2 640, and may transmit generated block 4 840 to the participants of the blockchain network 620.

In this case, FIG. 8 illustrates an example in which block 1 810, block 2 820, block 3 830, and block 4 840 are combined with a blockchain as mutual information verification is completed by the participants in the blockchain network 620. Data consumers may be aware that all of activity 1 and activity 3 of the member identified as the ID "XXX" in medium 1 630, activity 2 of the member identified as ID "ZZZ" in medium 3 650, and activity 4 of the member identified as ID "YYY" in medium 2 640 are continuous activities of user 1 610 through such a blockchain. In other words, the data consumers can track and use personal data in different services of user 1 610 using the data of the blockchain.

The aforementioned major terms may be defined as provided in Table 1.

TABLE 1

| Terms | Definition |
|---|---|
| Individual user | A subject who actually uses an online service or an app, and a data owner having use control over data generated due to the use and an individual identity. |
| Data provider | A subject that provides a user with a service in a form such as an online site, a computer program and/or an app and collects data through this process. The subject is also called a data provider because the subject transmits collected data to a blockchain network in lieu of an individual user. |
| Data consumer | A subject that creates a value using personal data in a blockchain network. The subject creates a profit by using individual user data, obtained after paying for a token (agreeing to pay for), in the execution of target advertising and customer analysis. |
| Public key | The address of a wallet on a blockchain in which a divider or token capable of identifying an individual user is stored. The public key is also called a personal identification key or a key value. |
| Block | A block (transaction block) is generated on a blockchain network by combining the public key of an individual user and records of data transmitted by a data provider. |
| Node | Nodes of a blockchain network act as a data storage and an evaluator, performs a task based on proof of believability (PoB), and defends the network against a variety of types of abuses and attacks. |
| Token | A core token used as transaction means by network participants in a blockchain protocol. |

FIG. 9 is a diagram illustrating an example of a process in which the data of an individual user is traded to data consumers and a value is circulated in a blockchain network in an embodiment of the present invention. FIG. 9 illustrates a user 910, a data provider 920, a blockchain network 930 and a data consumer 940. A first process 951 may be a process of selecting, by the user 910, data to be transmitted for each service through a personal identification key (or public key) that will become its own ID in various services and apps used by the user. In this case, to select the data may mean selecting a data provider so that data related to the activity of the user in a specific data provider can be tracked and used. FIG. 9 illustrates the media of search engine A, community service B, and survey service C as the data provider 920. Data sources dispersed into such media are bound based on the personal identification key.

A second process 952 may be an example of a process of transmitting, by the media (the data provider 920) belonging to the blockchain network 930, data of the user 910 to a data storage on the blockchain network 930. The media may define which log will be transmitted based on a characteristic for each provided service, and may directly transmit the data to the data storage on the blockchain network 930 through servers of the media according to the standard API rule of the blockchain network 930. In this case, a transaction block including the personal identification key may be generated in the blockchain network 930. The utilization of the data and a transaction history, starting from records of key generation, may be written on a blockchain. When user data transmitted by several media are interlaced by one personal identification key in the blockchain, a continuous behavior for the user 910 is assigned to an individual user log generated in each service and app, and online identity divided for each individual user can be born.

A third process 953 may be an example of a process of enriching and commodifying of data. Major participants that play different roles are present on the blockchain network 930. The major participants are denoted as nodes of the blockchain network 930. Such nodes perform tasks for storing and verifying data.

(1) Data Storage

User activity logs transmitted by media are encrypted, stored and managed by major participants acting as data storages. Bookkeeping for data transactions is included in blocks generated by the major participants. In the blockchain network 930, nodes may distribute and store data in their storages using an inter-planetary file system (IPFS) method, for example.

(2) Data Evaluator

Reliability evaluation needs to be performed on personal data collected by the blockchain network 930. This is a task that is essentially necessary to prevent redundant registration of data or value miss-evaluation according to data forgery. Nodes functioning as the data evaluator directly evaluate the reliability of data through an evaluation task or act as a witness for the authenticity of data, and generate blocks.

The nodes, such as the data storage or the data evaluator in the blockchain network 930, perform a task based on proof of believability (PoB). In this process, whether a token is owned and a degree of participation in a network may be incorporated as important factors. In FIG. 9, a decentralized application (Dapp) may mean an app used in a distributed network structure between participants.

A fourth process 954 may be an example of a process for value evaluation of data. Value evaluation for data provided by individual users through a medium is performed when the data is used by data consumers. The data consumer 940, such as an advertiser or a medium, defines data to be purchased (e.g., all female customers who have purchased goods belonging to category B within recent 6 months at shopping mall A and who have subscribed to site C), and writes, in a block, a kind of contract containing a purchase condition. Furthermore, when data reserved to be purchased generates a value, the data consumer 940 pays for the data using a token according to price setting logic of a blockchain. Furthermore, records of a data value change remain in blockchain books, and contribute to forming a customer profile as another data piece of a corresponding personal identification key.

A fifth process 955 may be an example of a process of providing a reward to the owner of data and the provider of the data. In the fourth process 954, if the data is finally purchased, a reward may be provided to the individual user (the user 910) who owns the data, a medium (the data provider 920) that has provided the corresponding data, and subjects that have increased the value of the corresponding data in the blockchain network 930.

Furthermore, in addition to the aforementioned major participants, there may be various additional subjects which can further enrich a personal data transaction ecosystem by participating in the blockchain platform according to embodiments of the present invention. Anyone can freely upload a service layer to the blockchain network 930. Hereinafter, some of possible forms of additional subjects are introduced.

(3) Data Processor

A data processor may function to cluster and package massive data accumulated on the blockchain network 930. For example, the data processor may generate a data package which may be well sold to advertisers, and the advertisers may purchase data packages suitable for them. In general, on the blockchain network 930, the data processor may take a role similar to a role represented as a DMP in the existing advertising ecosystem.

(4) Advertising Network

A platform that directly connects data, extracted from the blockchain network 930, to an advertising campaign so that advertising can be directly executed on corresponding users may be present as an additional subject of the blockchain network 930. Such a platform may process the exposure of advertising, the measurement and settlement of an index according to advertising execution, etc.

As described above, according to an embodiment of the present invention, personal data of the same user is provided to a blockchain network using a personal identification key in the blockchain network registered with respect to the corresponding user in different services in which the corresponding user is identified as different IDs. Accordingly, the personal data of the corresponding user in the different services can be tracked and used based on the personal identification key.

The aforementioned system or device may be implemented by a hardware component or a combination of a hardware component and a software component. For example, the device and components described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor or any other device capable of executing or responding to an instruction. A processor may perform an operating system (OS) and one or more software applications executed on the OS. Furthermore, the processor may access, store, manipulate, process and generate data in response to the execution of software. For convenience of understanding, one processor has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, a code, an instruction or a combination of one or more of them and may configure a processor so that it operates as desired or may instruct the processor independently or collectively. The software and/or data may be embodied in a machine, component, physical device, virtual equipment or computer storage medium or device of any type in order to be interpreted by the processor or to provide an instruction or data to the processor. The software may be distributed to computer systems connected over a network and may be stored or executed in a distributed manner. The software and the data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The recording medium may continue to store a program executable by a computer or may temporarily store the program for execution or download. Furthermore, the recording medium may be various recording means or storage means of a form in which one or a plurality of pieces of hardware has been combined. The recording medium is not limited to a medium directly connected to a computer system, but may be one distributed over a network. An example of the recording medium may be one configured to store program instructions, including magnetic media such as a hard disk, a floppy disk and a magnetic tape, optical media such as CD-ROM and a DVD, magneto-optical media such as a floptical disk, ROM, RAM, and flash memory. Furthermore, other examples of the recording medium may include an app store in which apps are distributed, a site in which other various pieces of software are supplied or distributed, and recording media and/or storage media managed in a server. Examples of the program instruction may include machine-language code, such as a code written by a compiler, and a high-level language code executable by a computer using an interpreter.

As described above, although the embodiments have been described in connection with the limited embodiments and drawings, those skilled in the art may modify and change the embodiments in various ways from the description. For example, proper results may be achieved although the above descriptions are performed in order different from that of the described method, and/or the aforementioned elements, such as a system, a configuration, a device, and a circuit, are coupled or combined in a form different from that of the described method or replaced or substituted with other elements or equivalents.

Accordingly, other implementations, other embodiments, and equivalents of the claims fall within the scope of the claims.

The invention claimed is:

1. A personal data processing method comprising steps of:

managing identifications (IDs) of a user registered with different data providers or data consumers, each of the data providers or data consumers generating an ID that uniquely identifies the user or an electronic device, wherein the IDs generated by the data providers or data consumers are different, and wherein the data providers or data consumers provide services to the user and collect data associated with the activities of the user related to the services;

associating, with the IDs, a personal identification key issued from a blockchain network that identifies a user of the blockchain network on any electronic device, wherein the personal identification key acts as a blockchain wallet address corresponding to the user, and wherein the personal identification key is associated with each of the IDs of the user provided by the different data providers or data consumers;

associating a cookie value of a browser cookie previously issued to a corresponding non-login user, with the personal identification key so that the non-login user can be identified as an actual user based on the personal identification key; and transmitting, to the blockchain network, a plurality of blocks, wherein each of the blocks includes the data related to the activities of the user with one of the data providers or data consumers and the blocks are each associated with different data providers or data consumers, and wherein the plurality of blocks are associated with the personal identification key so that the blocks are connected to the user in the blockchain.

2. The personal data processing method of claim 1, further comprising a step of obtaining the data related to the activities of the user, identified by the personal identification key, through blocks connected to the blockchain.

3. The personal data processing method of claim 1, further comprising a step of purchasing the data related to the activities of the user, identified by the personal identification key, using a token used by the participants as transaction means in the blockchain network.

4. The personal data processing method of claim 3, wherein a reward according to the purchase of the data is provided to at least one of the user identified by the personal identification key and the data provider or the data consumer which has provided, to the blockchain network, the data related to the activities of the user.

5. The personal data processing method of claim 1, wherein the data related to the activities of the user comprises data included in blocks connected to the blockchain, among the blocks transmitted to the blockchain network, so that each of the different data providers or data consumers is connected to the blockchain.

6. A personal data processing method of an advertiser system, comprising steps of:

identifying a user by obtaining, from a blockchain network, a personal identification key issued to the user to uniquely identify the user on any electronic device, wherein the personal identification key acts as a blockchain wallet address corresponding to the user;

associating a cookie value of a browser cookie previously issued to a corresponding non-login user, with the personal identification key so that the non-login user can be identified as an actual user based on the personal identification key;

obtaining, from the blockchain network, data related to activities of the user through blocks connected to the blockchain, wherein each of the blocks includes the data related to the activities of the user with one of the data providers or data consumers and the blocks are each associated with different data providers or data consumers, and wherein the data providers or data consumers provide services to the user and collect data associated with the activities of the user related to the services;

generating a customer profile of the user, uniquely identified by the personal identification key, based on the obtained data, wherein the personal identification key is associated with IDs of the user provided by the different data providers or data consumers; and directing target advertising to the user based on the generated customer profile, wherein the target advertising is advertising directed to the user based on the data related to activities of the user through blocks connected to the blockchain.

7. The personal data processing method of claim 6, wherein:

the personal identification key is associated with each of IDs of different data providers or data consumers having different identification systems for the user, and blocks containing data related to activities of the user in the different data providers or data consumers are transmitted to the blockchain network using the personal identification key so that the blocks are connected to the blockchain.

8. The personal data processing method of claim 6, wherein the step of obtaining data related to an activity of the user comprises obtaining data included in blocks connected to the blockchain, among the blocks transmitted to the blockchain network, so that each of the different data providers or data consumers is connected to the blockchain.

9. The personal data processing method of claim 6, wherein the step of obtaining data related to an activity of the user comprises purchasing the data related to the activity of the user, identified by the personal identification key, using a token as transaction means in the blockchain network.

10. The personal data processing method of claim 9, wherein a reward according to the purchase of the data is provided to at least one of the user identified by the personal identification key and the data provider or the data consumer which has provided, to the blockchain network, the data related to the activity of the user.

11. A computer device for processing personal data, comprising:

at least one processor implemented to execute a computer-readable recording instruction, wherein the at least one processor manages identifications (IDs) of a user registered with different data providers or data consumers, each of the data providers or data consumers generating an ID that uniquely identifies the user on any electronic device, wherein the IDs generated by the data providers or data consumers are different, wherein the data providers or data consumers provide services to the user and collect data associated with activities of the user related to the services, associates, with the IDs, a personal identification key issued from a blockchain network that identifies a user of the blockchain network on any electronic device, wherein the personal identification key acts as a blockchain wallet address corresponding to the user, and wherein the personal identification key is associated with each of the IDs of the user provided by the different data providers or data consumers, associates a cookie value of a browser cookie previously issued to a corresponding non-login user with the personal identification key so that the non-login user can be identified as an actual user based on the personal identification key; and transmits, to the blockchain network, a plurality of blocks that each comprise the data related to the activities of the user with one of the data providers or data consumers and the blocks are associated with different data providers or data consumers, and wherein the plurality of blocks are associated with the personal identification key so that each block is connected to the user in the blockchain.

12. The computer device of claim 11, wherein the at least one processor obtains the data related to the activities of the user, identified by the personal identification key, through blocks connected to the blockchain.

13. The computer device of claim 11, wherein the at least one processor purchases the data related to the activities of the user, identified by the personal identification key, using a token as transaction means in the blockchain network.

14. The computer device of claim 13, wherein a reward according to the purchase of the data is provided to at least one of the user identified by the personal identification key and the data provider or the data consumer which has provided, to the blockchain network, the data related to the activities of the user.

15. The computer device of claim 11, wherein:

the personal identification key is associated with each of IDs of different data providers or data consumers having different identification systems for the user, and blocks comprising data related to activities of the user in the different data providers or data consumers are transmitted to the blockchain network using the personal identification key so that so that the blocks are connected to the blockchain.

16. A computer device for processing personal data comprising:

at least one processor implemented to execute a computer-readable recording instruction, wherein the at least one processor identifies a user by obtaining, from a blockchain network, a personal identification key issued to the user to uniquely identify the user on any electronic device, wherein the personal identification key acts as a blockchain wallet address corresponding to the user, associates a cookie value of a browser cookie previously issued to a corresponding non-login user with the personal identification key so that the non-login user can be identified as an actual user based on the personal identification key;

obtains, from the blockchain network, data related to activities of the user through blocks connected to the blockchain, wherein the blocks each comprise the data related to the activities of the user with one of the data providers or data consumers and the blocks are each associated with different data providers or data consumers, and wherein the data providers or data consumers provide services to the user and collect data associated with the activities of the user related to the services, generates a customer profile of the user, uniquely identified by the personal identification key, based on the obtained data, wherein the personal identification key is associated with IDs of the user provided by the different data providers or data consumers; and directs target advertising to the user based on the generated customer profile, wherein the target advertising is advertising directed to the user based on the data related to activities of the user through blocks connected to the blockchain.

17. The computer device of claim 16, wherein:

the personal identification key is associated with each of IDs of different data providers or data consumers having different identification systems for the user, and blocks containing data related to activities of the user in the different data providers or data consumers are transmitted to the blockchain network using the personal identification key so that the blocks are connected to the blockchain.

* * * * *